United States Patent
Izumi

(10) Patent No.: US 7,622,415 B2
(45) Date of Patent: Nov. 24, 2009

(54) POLYMERIZATION CATALYST COMPOSITION FOR ETHYLENE OXIDE AND PROCES FOR THE PRODUCTION OF POLY(ETHYLENE OXIDE) WITH THE SAME

(75) Inventor: Hideki Izumi, Kyoto (JP)

(73) Assignee: Meisei Chemical Works, Ltd., Kyoto (JP)

(*) Notice: Subject to any disclaimer, the term of this patent is extended or adjusted under 35 U.S.C. 154(b) by 541 days.

(21) Appl. No.: 10/534,000

(22) PCT Filed: Oct. 30, 2003

(86) PCT No.: PCT/JP03/13970

§ 371 (c)(1),
(2), (4) Date: May 4, 2005

(87) PCT Pub. No.: WO2004/041909

PCT Pub. Date: May 21, 2004

(65) Prior Publication Data

US 2006/0036066 A1 Feb. 16, 2006

(30) Foreign Application Priority Data

Nov. 5, 2002 (JP) .............................. 2002-320730

(51) Int. Cl.
*B01J 31/14* (2006.01)
*B01J 37/00* (2006.01)
*C08G 65/12* (2006.01)
*C08G 65/34* (2006.01)

(52) U.S. Cl. ....................... 502/132; 502/102; 502/103; 502/104; 528/425; 528/485; 528/488; 528/489

(58) Field of Classification Search .................. 528/425, 528/485, 488, 489; 502/102, 103, 104, 132
See application file for complete search history.

(56) References Cited

U.S. PATENT DOCUMENTS 3,321,533 A 5/1967 Patton, Jr.

FOREIGN PATENT DOCUMENTS

| JP | 2000-086755 | 3/2000 |
|---|---|---|
| JP | 2000-256457 | 9/2000 |
| JP | 2002-128886 | 5/2002 |
| JP | 2002-293915 | 10/2002 |
| JP | 2003-138003 | 5/2003 |

*Primary Examiner*—Duc Truong
(74) *Attorney, Agent, or Firm*—Kirschstein, et al.

(57) ABSTRACT

Provided are a polymerization catalyst composition for ethylene oxide which can give polyethylene oxide having a molecular weight lower than that of the prior art and a relatively narrow molecular weight distribution, and a process for the production of polyethylene oxide by the use of the catalyst composition. The catalyst composition makes it possible to produce polyethylene oxide having a molecular weight ranging from about 20,000 to 200,000 through direct polymerization in a high yield with economic advantage, and is characterized by comprising an organoaluminum compound and at least one member selected from among alkali metal alkoxides and alkali metal hydroxides. According to the process, polyethylene oxide having a molecular weight failing within the above range can be produced by the use of the catalyst composition under the same polymerication conditions as those of the prior art.

9 Claims, No Drawings

POLYMERIZATION CATALYST COMPOSITION FOR ETHYLENE OXIDE AND PROCES FOR THE PRODUCTION OF POLY(ETHYLENE OXIDE) WITH THE SAME

TECHNICAL FIELD

The present invention relates to a catalyst composition for use in polymerization of ethylene oxide (a polymerization catalyst composition for ethylene oxide) and to a method for the production of poly (ethylene oxide). More particularly, it relates to a polymerization catalyst composition for ethylene oxide which can produce, in high yield, poly(ethylene oxide) having a relatively low molecular weight and a sharp molecular weight distribution, and to a method for the production of such poly(ethylene oxide).

BACKGROUND ART

Polymers of ethylene oxide have heretofore been produced in two molecular weight ranges. Those whose maximum molecular weight is about 20,000 to 30,000 are called "polyethylene glycol." Examples of non-patent documents dealing with such material include K. C. Frisch et al.: "Ring Opening Polymerization", New York, Marcel Dekker (1969) and T. Saegusa: "Ring Opening Polymerization", Washington, published by Am. Chem. Soc., 1977.

On the other hand, ethylene oxide polymers having a molecular weight of about several hundreds of thousands to about 8,000,000 are referred to as "poly (ethylene oxide)." Examples of patent documents in which such a technology is disclosed include U.S. Patent Specification No. 2971988, JP-B No. S45-7751 and JP-B No. S53-27319.

Documents concerning ethylene oxide polymers are fraught with much confusion. The two terms, polyethylene glycol and poly(ethylene oxide), are often used exchangeably. In Chemical Abstracts, there is, in fact, only one index number for polymers of ethylene oxide. It has been considered that those of only two different molecular weight ranges can be produced and a significant difference in that those are produced by quite different methods has not been recognized.

One of the methods is, as already stated, able to produce only those having a maximum molecular weight between about 10,000 and 30,000. The other method is able to produce only those having a maximum molecular weight between about 100,000 and 900,000 and those having a minimum molecular weight of 900,000 or more. It, therefore, is apparent that it was impossible to produce ethylene oxide polymers having molecular weights not less than about 30,000 and not more than about 100,000. When taking account of many applications of such polymers having medium molecular weights, there is a wide requirement for eliminating the existing molecular weight gap.

Ethylene oxide polymers having molecular weights within the range of several hundreds of thousands or more normally have a very wide molecular weight distribution and it is true that it is difficult to control their molecular weight during their production.

Furthermore, it is very difficult to produce ethylene oxide polymers having molecular weights of 100,000 or more economically in high yields. The method generally known in the art is to reduce the molecular weight of a polymer initially produced so as to have a molecular weight of 1,000,000 or more by gamma-ray irradiation in order to obtain a polymer having a desired molecular weight within the range of 100,000 to 900,000.

Therefore, there is a demand for ethylene oxide polymers having molecular weights within the range of not less than about 10,000 to 30,000 and not more than about 100,000, which is a range having not been achieved. However, no suitable catalysts capable of achieving such a result have been disclosed.

The object of the present invention is to provide a polymerization catalyst composition capable of producing a poly (ethylene oxide) polymer having a molecular weight range from about 20,000 to 200,000 by direct polymerization economically in a high yield and a method for the production of a poly (ethylene oxide) polymer utilizing the polymerization catalyst composition.

The present inventors studied diligently to solve the above-mentioned problems. As a result, we found that when a specific polymerization catalyst composition is used in the production of poly (ethylene oxide) by directly polymerization of ethylene oxide, the polymerization of ethylene oxide proceeds extremely satisfactorily and the molecular weight distribution becomes very sharp and, therefore, the molecular weight of the resulting polymer can be controlled within a specific range. Thus, the inventors have accomplished the present invention.

DISCLOSURE OF THE INVENTION

In the present patent application, disclosed are a material composition and a method for use in the production of ethylene oxide polymers which have not been made available by any conventional production technique. The lower limit of the molecular weight range is 10,000 to 30,000. On the other hand, the upper limit of the range is about 100,000.

Another object of the present invention is to disclose a novel catalyst composition composed of two components, component A and component B. When the component A and component B are employed together, the resulting catalyst "system" can initiate polymerization of ethylene oxide successfully to produce a molecular weight within a desired range of about 20,000 to about 200,000 with a narrow molecular weight distribution, which is characterized by a low polydispersity. Thus, it is possible to achieve the polymerization of ethylene oxide in a high yield economically by direct polymerization.

In addition, the present application also discloses useful application fields of wide range.

BEST MODES FOR CARRYING OUT OF THE INVENTION

It was found that a certain kind of catalyst component causes an extremely efficient polymerization of ethylene oxide. Furthermore, it was also found that such polymers are of specifically narrow molecular weight distribution and that the desired control of molecular weight can be achieved easily.

The above-mentioned catalyst useful in the present invention is generally composed of two components. Component A, which is a first component, is an organoaluminum compound. Component B, which is a second component, is composed of at least an alkali metal alkoxide compound or an alkali metal hydroxide compound.

Still another object of the disclosure of the present invention is to disclose a method for producing polyethylene oxide polymers within a certain range. These polymers have a narrow molecular weight distribution and are produced by use of the new catalyst composition described in the present application. The catalyst composition of the present invention comprises an organoaluminum compound and an alkali metal alkoxide compound or alkali metal hydroxide compound. The polymerization of ethylene oxide is initiated and a desired polyethylene oxide polymer is produced by either use of only one of the alkali metal alkoxide compound or the alkali metal hydroxide compound or use of a combination of the alkali metal alkoxide compound and the alkali metal hydroxide compound.

That is to say, the catalyst composition for the production of a poly(ethylene oxide) polymer of the present invention is a catalyst composition capable of producing a poly(ethylene oxide) polymer having a molecular weight range from about 20,000 to 200,000 by direct polymerization economically in a high yield, wherein the catalyst composition comprises component A: an organoaluminum compound and component B: at least one kind of an alkali metal alkoxide compound or an alkali metal hydroxide compound.

Moreover, the present invention is a method for producing poly(ethylene oxide) using a catalyst composition capable of regulating to a desired molecular weight within the range of from about 20,000 to 200,000. The method is characterized in that a catalyst composition comprising component A: an organoaluminum compound and component B: at least one kind of an alkali metal alkoxide compound or an alkali metal hydroxide compound is used and that a poly(ethylene oxide) having a relatively narrow molecular weight distribution and a relatively low molecular weight, which poly (ethylene oxide) is characterized by a low polydispersity (a polydispersity of less than 2.0), is obtained by regulating the ratio of the component A and the component B in the catalyst composition.

First, the catalyst composition for producing a poly(ethylene oxide) polymer of the present invention is explained.

The component A contained in the catalyst composition of the present invention is a substance which is composed of a suitable organoaluminum compound and has only an Al—C bond in the molecule. The component A has no Al—O bond. Any compound having an Al—C bond is included within the scope of claim of the disclosure of the present invention. Examples of a suitable organoaluminum compound include, but are not limited to, trimethylaluminum, triethylaluminium, triisobutylaluminium, triphenyl aluminium, diphenylisobutylaluminium and monophenyldiisobutylaluminum. The most preferred compound in the suitable organoaluminum compounds is triisobutylaluminium. A suitable organoaluminum compound (component A) may be not only an individual compound but also a mixture of one or more kinds of organoaluminum compound.

On the other hand, examples of the alkali metal alkoxide, which is the component B, include, but are not limited to, methoxides, ethoxides, propoxides, butoxides and the like of cesium, rubidium, potassium, sodium, lithium and the like. Among these, potassium t-butoxide is the most preferable.

The component B may also be alkali metal hydroxide. Specific examples include, but are not limited to, lithium hydroxide, sodium hydroxide, potassium hydroxide, cesium hydroxide and rubidium hydroxide. Among alkali metal hydroxides, potassium hydroxide is the most preferable.

The component B may also be composed of a mixture of alkali metal alkoxide and alkali metal hydroxide.

In the present invention where a specific catalyst mixture is used, any known additive for catalysts may be employed in an effective amount unless the polymerization reaction is inhibited. Such a substance does not inhibit the polymerization reaction of ethylene oxide even when it is used together with the catalyst composition comprising the component A and the component B. A patent document in which such a technology is disclosed is, for example, JP-A No. S62-232433.

An effective molar number of the organoaluminum compound of the component A to the alkali metal alkoxide and/or the alkali metal hydroxide of the component B is 3 mol or more.

A useful concentration of the catalyst composition containing both the component A and the component B is 0.1 to 5.0 mol % of an Al atom based on the ethylene oxide. Preferably, a range of 0.2 to 3.0 mol % is desirable. Most preferably, a range of 0.4 to 1.5 mol % is optimal.

If the catalyst concentration is less than about 0.4 mol %, the polymerization tends to become slow. If the catalyst concentration is less than about 0.2 mol %, the polymerization hardly proceeds in some cases.

The inventors of the present invention have not exactly unveiled the action mechanism of the catalyst composition of the present invention scientifically, but we think that alkali metal ions in the component B serve to initiate the polymerization and aluminum atom-containing compounds of the component A act so as to take a stereochemical conformation suitable for effective polymerization of ethylene oxide. Accordingly, the control of the desired molecular weight of a resulting polyethylene oxide polymer can be effectively achieved through regulation of the molar ratio of the organoaluminum compound of the component A on the basis of the molar ratio of the component B.

Next, explained is the method for the production of poly (ethylene oxide) using the aforementioned catalyst composition.

The polymerization of ethylene oxide using the catalyst composition described in the present specification can be practiced by use of known methods which have been already published concerning other catalyst compositions. Examples of patent documents in which such a technology is disclosed include JP-B No. S45-7751 and JP-B No. S53-27319. For example, either alkali metal alkoxide or an alkali metal hydroxide compound is added first into a suitable solvent in the presence of anhydrous inert gas such as nitrogen and helium at room temperature. Then, an organoaluminum compound is added to the solvent. Finally, a required amount of ethylene oxide is added so as to initiate the polymerization.

Specific examples of suitable known solvents include ethers, aliphatic hydrocarbons, aromatic hydrocarbons, halogen-containing solvents and ketones. For the purpose of the present invention, two or more sorts of solvents may be used in combination. Examples of the most preferable aliphatic solvents include n-butane, isobutane, n-pentane, cyclopentane, industrial hexane, n-hexane, isohexane, cyclohexane, n-heptane and n-octane. Such hydrophobic solvents are very favorable. This is because a poly(ethylene oxide) powder produced by the polymerization reaction is easy to dry and it is possible to handle the powder without allowing it cohere since the powder is insoluble in such volatile organic substances.

The polymerization reaction of the present invention can be carried out in a wide temperature range known in the art. Examples of patent documents in which such a technology is disclosed include JP-B No. S45-7751 and JP-B No. S53-27319. However, it is desirable that such a polymerization reaction be carried out within the range of 0 to 50° C. Such a range is the same as that used by a person skilled in the art.

EXAMPLES

The present invention is explained in conjunction with the following production examples. These examples are not intended in any way to serve as a limitation upon the scope of the present invention. In the examples, "part(s)" and "%" are used as those on a weight basis. All of these examples used an inert gas such as nitrogen and helium and were carried out under anhydrous conditions. The polydispersity in the examples is an index expressing the molecular weight distribution. The molecular weight and the molecular weight distribution (polydispersity) [Mw(weight average molecular weight)/Mn (number average molecular weight)] of each product obtained by polymerization were measured by GPC (aqueous system).

Example 1

Into a 1-L autoclave, 200 ml of dehydrated n-hexane was charged and 1.0 mmol of potassium t-butoxide was added. Subsequently, 10 ml of a 1.0 M triisobutylaluminium (Al(i-Bu)$_3$) solution in n-hexane was added to yield a polymerization catalyst composition of the present invention.

Thereafter, 1.0 mol of ethylene oxide gas was supplied into the solution in the reactor slowly over a 1.5 hour period. The reaction temperature was the temperature of the surrounding air (in other words, 25° C.).

After the completion of the addition of the predetermined amount of ethylene oxide, the system was stirred for about two hours to yield a slurry containing a polyethylene oxide powder in n-hexane.

The resulting slurry was filtered and then dried under reduced pressure conditions. Thus, a granular polyethylene oxide powder was finally obtained.

The yield of this reactive was 99.5%. The molecular weight and the polydispersity measured by GPC were 40,000 and 1.28, respectively.

Example 2

This example was carried out in the same manner as Example 1 except that 2.4 mol, which was 2.4 times that of Example 1, of ethylene oxide was supplied to the reactor.

The yield of the resulting polyethylene oxide was 97%. The molecular weight and the polydispersity measured by GPC were 100,000 and 1.48, respectively.

Example 3

A method similar to that described in Example 1 was used. Regarding the catalyst system, the concentration of potassium t-butoxide was reduced from 1.0 mmol to 0.6 mmol and the amount of the 1.0 M triisobutylaluminium (Al(i-Bu)$_3$) solution in n-hexane was changed from 10 ml to 6 ml. To the reactor containing the aforementioned catalyst system, 2.4 mol of ethylene oxide was supplied over 2 hours and then the resulting system was stirred for 20 hours.

The resulting slurry of polyethylene oxide in n-hexane was subjected to filtration and subsequent drying under reduced pressure conditions. Thus, a granular product was finally obtained.

The yield of this reaction was 70%. The resulting molecular weight was 150,000 as measured by GPC. The polydispersity was 1.96.

As shown in Examples 1 to 3, when the amount of the ethylene oxide to be used was twice or three times (on the basis of the concentration of the catalyst system used), the molecular weight of a resulting polyethylene oxide correspondingly doubled or tripled. In the results of these three cases, a desired molecular weight of a low-polydispersity polyethylene oxide having a molecular weight up to at least 150,000 can be achieved and also can be controlled when a catalyst system of the present invention is used for the initiation of polymerization of ethylene oxide.

Comparative Example 1

A method similar to that described in Example 1 was used. Regarding the catalyst system, the 1.0 M triisobutylaluminium (Al(i-Bu)3) solution in n-hexane was replaced by 10 mmol of aluminum isopropoxide (Al(OCH(CH$_3$)$_2$)$_3$). When polymerization was carried out using the catalyst system, the yield was only 2%. The resulting molecular weight was 25,000 as measured by GPC. The polydispersity was 2.48.

INDUSTRIAL APPLICABILITY

The object of the present invention is to produce a relatively low molecular weight poly(ethylene oxide) in the form of solid, granule or powder which is formed by the method of the present invention. The aforesaid powder form possesses a significant advantage over the polyethylene glycols produced by conventional techniques. This is because these are typical wax-type substances within a maximum molecular weight range of 10,000 to 30,000.

Typically, the wax-type substances in the prior art are particularly difficult to handle in some applications such as thermoplastic processing in comparison to those of the present invention having a low polydispersity being in the form of solid or granule. The polymers of the present invention exist in the form of powder. These produce a possibility of use for a wide variety of applications not only when being used alone but also when being used together with an ethylene oxide polymer having a large or small molecular weight. These may be used in combination with other water-soluble polymers, partially water-soluble polymers (that is, hydrophobically modified, so-called "bond thickeners") or inorganic clay thickeners and/or in combination with water-insoluble thermoplastic polymers.

Specific examples of such applications include, but are not limited to, papermaking, fiber, paint, medical products, cosmetics, personal care products, toiletries, ceramics, chemical products, printing products, agriculture and forestry products, aquatic field, environmental field, construction building material products, electricity, instruments, machinery and metalworking. The product of the present invention is useful particularly in the fields of medical products, cosmetics, personal care products and toiletries.

The invention claimed is:

1. A catalyst composition for producing a polyethylene oxide polymer having a molecular weight range from 20,000 to 200,000 by direct polymerization economically in a high yield, wherein the catalyst composition consists of both component A and component B, said component A being an organoaluminum compound selected from the group consisting of a trialkylaluminum compound and a tricycloalkylaluminum compound, and said component B being at least one kind of an alkali metal alkoxide compound.

2. The catalyst composition as defined in claim 1, wherein the trialkylaluminum compound is tri-isobutyl aluminum.

3. The catalyst composition as defined in claim 1, wherein the alkali metal alkoxide compound is potassium t-butoxide.

4. The catalyst composition as defined in claim 1, wherein the component A is contained in an amount of 3 mol or more per mol of the component B.

5. A method of producing a polyethylene oxide having a molecular weight range of from 20,000 to 200,000, in which ethylene oxide is polymerized by using a catalyst composition according to claim 1.

6. The method of producing polyethylene oxide as defined in claim 5, wherein the molar ratio of the component A in the catalyst composition is regulated to 3 mol or more per 1 mol of the component B.

7. The method of producing polyethylene oxide as defined in claim 5, wherein the amount of the catalyst composition used is 0.1 to 5.0 mol % of an Al atom based on ethylene oxide.

8. The method of producing polyethylene oxide as defined in claim 5, wherein the amount of the catalyst composition used is 0.2 to 3.0 mol % of an Al atom based on ethylene oxide.

9. The method of producing polyethylene oxide as defined in claim 5, wherein the amount of the catalyst composition used is 0.4 to 1.5 mol % of an Al atom based on ethylene oxide.

* * * * *